UNITED STATES PATENT OFFICE.

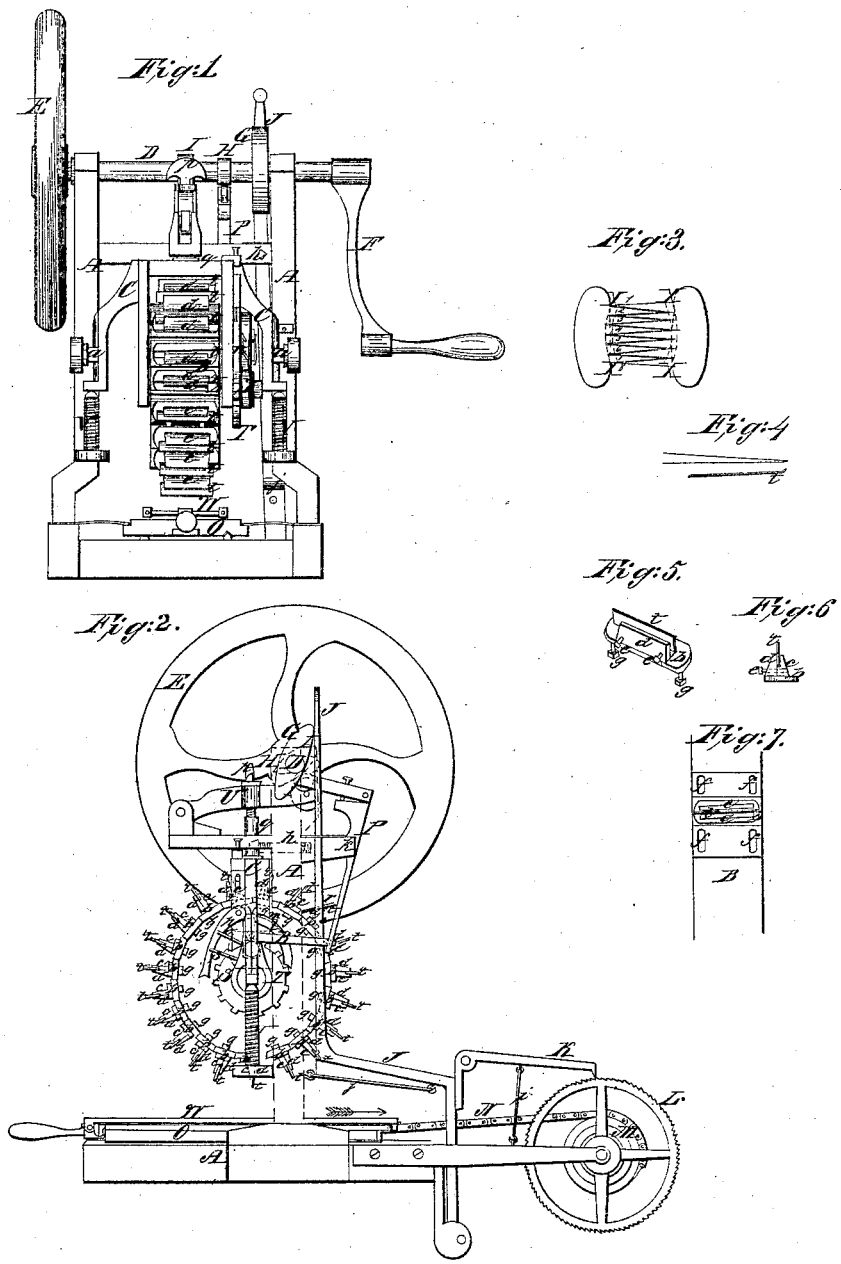

S. CURTIS, OF NEWTOWN, CONNECTICUT.

MACHINE FOR CUTTING COMBS.

Specification of Letters Patent No. 8,522, dated November 18, 1851.

*To all whom it may concern:*

Be it known that I, S. CURTIS, of Newtown, in the county of Fairfield and State of Connecticut, have invented a new and useful Machine for Twinning or Cutting Comb-Teeth; and I do hereby declare that the following is a full, clear, and exact description of the construction and operation of the same, reference being had to the annexed drawings, making a part of this specification, in which—

Figure 1, is a front elevation. Fig. 2, is a side elevation. Fig. 3, is a side view showing the shape of the pieces into which the horn or stock is cut, two combs being obtained from each piece. Fig. 4, is a view of a comb tooth and cutter. Fig. 5, is a perspective view of one of the plates with a cutter secured between the jaws. Fig. 6, is a side elevation of ditto. Fig. 7, is a section of the wheel, one plate being shown, and placed in such a position as to form an angle with the axis of the wheel.

Similar letters of reference are used in the different figures to indicate corresponding parts.

The nature of my invention consists in having a series of cutters placed on the periphery of a wheel, said wheels having a rotary motion and also a motion in a transverse line with its axis. The horn or stock of which the combs are made are first cut the required shape, by which two combs are produced at a single operation; the horn thus cut is placed or secured upon a carriage which runs upon ways directly under the wheel, upon turning a crank the wheel by a system of levers and cams is made to revolve the required distance so as to bring the proper cutter over the horn, the wheel then has the other motion communicated to it and descends, the cutter piercing through the horn and cutting one side of a tooth, the wheel then ascends, being acted upon by springs, and again revolves till another cutter is brought to the required spot, the wheel again descends and cuts the other side of the tooth and so on, the horn being moved the requisite distance under the wheel as it rotates by means of the carriage.

To enable those skilled in the art to make and use my invention I will proceed to describe its construction and operation.

A, A, Figs. 1 and 2, represent the frame of the machine; B, is the wheel which is hung or has the bearings of its axis in a gate C, which works in suitable grooves $a$, $a$, more particularly seen in Fig. 1. The wheel B, is many sided and a plate $b$, is placed on each side; to each plate there is a vertical jaw $c$, permanently attached to it, seen more particularly in Figs. 2, and 6, these jaws have recesses at their tops in which the cutters $t$, are placed any are secured in them by means of jaws $d$, which are detached from the plate, they are pressed against the cutters by means of set screws $e$, $e$, only represented in Figs. 5, and 6, this will be fully understood by referring to Figs. 5 and 6. The periphery of the wheel is pierced with oblong slots $f$, see Fig. 7, through which bolts $g$, pass into the plates $b$, securing them to the wheel, the slots are oblong, so that the plates may be varied as regards their position, forming a greater or less angle with the axis of the wheel, the cutters requiring to be varied according to the shape it is designed to give the teeth as will be seen hereafter.

D, is a shaft running across the top of the frame A, A, having a fly wheel E, at one end and a crank F, at the other by which the shaft is turned; upon this shaft are placed three cams G, H, I; the cam G, as the shaft is turned operates upon the lever J, the pawl K, which is attached to the lever turning the ratchet wheel L; on the shaft of the ratchet wheel is placed a cone of pulleys M, over one of which a chain N, passes, and is attached to the carriage O; now it will be seen that as the ratchet wheel is turned the chain N, is wound on the pulley and the carriage drawn forward. The exact feed of the carriage is regulated by the set screw $h$, as this is screwed out or in, the cam G, will operate to a greater or less extent upon the lever and the ratchet wheel will be moved as far as required at every revolution of the crank by the proper adjustment of the set screw, this will be understood by referring to Fig. 2; the feed of the carriage may also be decreased if necessary by attaching the chain N, to one of the smaller pulleys on the cone M. The pawl K is kept down upon the ratchet wheel by the spring $i$, and the lever J, is brought back and kept up to the cam G, by the spring $j$; H is the cam which operates the wheel B, this arrangement will be seen by referring to Fig. 2.

P, is a bent lever against the upper part of which the cam H, acts, a friction roller being placed in the end of the lever for the cam to work on; the fulcrum of this lever is at $k$.

R, is an arm attached to the lower end of the lever P, by a pivot and connected to an upright S, said upright being placed loosely on the axes of the wheel; to the upper part of the upright is attached a pawl $l$, which catches into the ratchet wheel T, a spring $m$, pressing the pawl on the ratchet. The ratchet wheel T, is hung upon the same shaft as the wheel B.

$n$, is a pawl the upper part of which is attached to the gate C, it will be seen that as the upper part of the lever P, is depressed by the cam H, the lower end of the lever is forced outward, the arm R, drawing the upright S, in the same direction, the pawl $l$, being forced upon the ratchet wheel T, by the spring $m$, the ratchet revolves and with it the wheel B; the pawl $n$, is connected to the upright S, by a spring $o$, by which the pawl $n$, is made to catch into the teeth of the ratchet after it has turned a certain distance. When the pawls $l$, $n$, are upon the ratchet wheel T, the wheel B, is prevented from turning and is kept steady owing to the ratchet being attached to the shaft of the wheel B, the cam H, being then nearly in a vertical position, while in this state the cam I, acts upon the lever U, and depresses it and also the gate C, in which the wheel B, is hung; a set screw $p$, passing through the lever U, and acting upon a pin $q$ on the top of the gate. See Fig. 2. By these means the wheel is made to rotate and also to descend; after the end of the cam I has passed the end of the lever U, the wheel is forced upward by the springs V, V, and the upper part of the lever P, is elevated by the spring $r$, which draws the lower part of the lever inward or toward the ratchet when the upper part is relieved of the cam H, the upright S, throwing back the pawl $n$ from the ratchet by acting upon the stud $s$, which is attached to it. As different mechanical arrangements may be employed for operating the carriage O, and also for operating the wheel, and as I do not closely confine myself to the devices shown and described for these purposes, I will without further description of them proceed to show the manner in which the machine is operated.

The horn is cut the shape as represented in Fig. 3, and secured upon the carriage O, by the clamp W, or by any proper method; the horn is so adjusted on the carriage under the wheel that the first knife will cut the horn in the proper place, for instance, if the wheel descends and the cutter makes the cut 1, see Fig. 3, the wheel will then raise and revolve till the second cutter occupies the position that the first cutter did, the carriage O, being moved along the required distance by means of the lever J, and cam G, as the wheel turns, the wheel again descends and the cut 2, is made and so on, the alternate ends of the cutters may have a small curve or projection as seen in Fig. 4, which will round the ends of the teeth, these curves should be in the same direction on the cutters till they reach the center tooth or the cutter which cuts the center tooth and then must be reversed on the cutters the other side in order to make the ends of the teeth conform to the shape of the curve; two combs it will be seen are formed from the one piece of horn, and the cutters are placed on the periphery of the wheel B; so that the cuts through the horn will be as represented in Fig. 3, and form proper shaped teeth. This is why oblong slots $f$, are made through the periphery of the wheel as before stated so that the plates $b$, and consequently the cutters may be placed upon the periphery forming the required angle with the axis of the wheel. The cutters are arranged on the wheel so as to cut the teeth of the length and shape desired. It must be borne in mind that the carriage O, moves while the wheel B, is turning and at no other time, and the rotary motion of the wheel as well as the motion of the carriage ceases while the wheel is descending this is owing to the position of the cams G, H, I, on the shaft D, they are placed in the position as seen in Fig. 2, by which they act upon the different levers at the proper time.

The advantages of this machine over the ordinary process which is done by hand or over the machines in use, will readily be admitted, by those who have seen them, but there is one important item which it is necessary to describe, viz: the saving of stock. No stock is lost in using the machine, but there is in sawing the teeth by hand; it is well known that the ends of the teeth form a portion of a circle to correspond to the curve at the top of the comb. See the dotted lines in Fig. 3. Now when the teeth are sawed by hand they are generally made in order to save labor of equal length and afterwards rounded. The teeth being cut to the lines X, X, X, X, by this process, about 15 per cent of the stock is lost, which I save.

I estimate to save about 15 per cent in stock and labor by my machine over those now used and about twenty per cent over the hand process.

Having thus described the nature and operation of my invention, what I claim as new and desire to secure by Letters Patent is—

The wheel B, with the cutters $t$, placed on its periphery as described, said wheel having a rotary motion and also a vertical reciprocating motion in a line transverse with its axis for the purpose of turning or cutting comb teeth substantially as described, said motion being given the wheel by means of the cams H, I, levers P, U, and pawls $l$, $n$, or their equivalents as set forth.

S. CURTIS.

Witnesses:
O. D. MUNN.
S. H. WALES.